United States Patent [19]

Johnson et al.

[11] 4,209,243
[45] Jun. 24, 1980

[54] SHUTTER AND TRIM APPARATUS

[75] Inventors: Bruce K. Johnson, Andover; George D. Whiteside, Lexington, both of Mass.

[73] Assignee: Polaroid Corporation, Cambridge, Mass.

[21] Appl. No.: 965,491

[22] Filed: Dec. 1, 1978

[51] Int. Cl.² ............................ G03B 7/14; G03B 9/00
[52] U.S. Cl. .................................. 354/30; 354/59; 354/230
[58] Field of Search .................... 354/27, 29, 30, 40, 354/42, 43, 44, 32, 34, 59, 139, 149, 145, 234, 235, 237, 137, 138, 230, 232, 260, 266, 267, 259, 270, 271, 26, 228, 231

[56] References Cited

U.S. PATENT DOCUMENTS

| | | | |
|---|---|---|---|
| 3,046,859 | 7/1962 | Distel | 354/48 |
| 3,205,795 | 9/1965 | Grey | 354/51 |
| 3,471,226 | 10/1969 | Wasielewski et al. | 354/234 X |
| 3,750,543 | 8/1973 | Eloranta et al. | 354/27 |
| 3,832,722 | 8/1974 | Douglas | 354/29 |
| 3,927,415 | 12/1975 | Petersen | 354/230 |
| 4,007,468 | 2/1977 | Blinow et al. | 354/59 |
| 4,016,573 | 4/1977 | Mücke | 354/26 |
| 4,023,187 | 5/1977 | Shenk | 354/27 |
| 4,040,072 | 8/1977 | Johnson et al. | 354/230 X |
| 4,149,794 | 4/1979 | Takahama et al. | 354/234 X |

Primary Examiner—L. T. Hix
Assistant Examiner—William B. Perkey
Attorney, Agent, or Firm—Edward S. Roman

[57] ABSTRACT

A photographic camera apparatus includes an automatic exposure control arrangement having scanning shutter blade elements which are accelerated to a determinate velocity and thereafter released for movement through a range of progressively varying sized apertures at the determinate velocity to define a photographic exposure cycle. A uniform trim control is provided to give the photographer a degree of overriding personal control through which he may slightly vary film exposure by simultaneously varying the determinate velocity at which the shutter blade elements traverse the aperture range and the amount of scene light transmitted to a photoresponsive control system which automatically controls film exposure.

23 Claims, 4 Drawing Figures

SHUTTER AND TRIM APPARATUS

BACKGROUND OF INVENTION

1. Field of the Invention

This invention relates generally to a photographic exposure control system with uniform trim control, and more particularly to a photographic exposure control system wherein the shutter blade elements are moved through a range of progressively varying aperture sizes at a determinate velocity and additionally including a trim control for uniformly varying exposure by changing the determinate velocity by which the shutter blade elements traverse the aperture range.

2. Description of the Prior Art

Fully automatic exposure control systems of the type used in Polaroid Corporation's SX-70 and Pronto type cameras are now well known in the art. Such fully automatic exposure control systems have generally employed a trim mechanism for providing the photographer with a degree of overriding personal control through which he may slightly vary film exposure to account for variations in the ambient scene lighting conditions as well as slight variations in the sensitometric characteristics of the film.

In photographic apparatus of the aforementioned type having light responsive exposure control systems, including scene light integrating circuits embodying photocells, the trim control has been arranged to selectively position a plurality of varying light transmissive sections over the light sensing photocell of the light responsive exposure control system. Such exposure control systems have also embodied follow focus arrangements as described in U.S. Pat No. 3,750,543, entitled "Focus Responsive Exposure Control System", by V. Eloranta et al. issued in common assignment herewith. Trim mechanisms of the aforementioned type have also been keyed to vary the follow focus control so that any exposure value alteration inserted as a trim from the trim control becomes simultaneously transmitted to the follow focus system as well as into the light detecting photocell. This arrangement has been utilized in systems of the so-called hybrid type as disclosed in U.S. Pat. No. 4,007,468, entitled "Trim Control Apparatus for Photographic Exposure Control System" issued Feb. 8, 1977 in common assignment herewith. Since trim mechanisms of the aforementioned type are operated in conjunction with follow focus systems, it has not been possible to provide an entirely uniform trim control across the entire range of apertures to which the shutter blade elements scan.

Therefore, it is a primary object of this invention to provide a uniform trim control for use with photographic apparatus of the type having automatic exposure control systems.

It is a further object of this invention to provide an exposure control system, wherein the shutter blade elements may be moved at a determinate speed through a progressively varying range of aperture sizes and wherein the exposure may be uniformly trimmed by varying the determinate speed at which the shutter blade elements traverse the aforementioned aperture range.

Other objects of the invention will, in part, be obvious and will, in part, appear hereinafter. The invention accordingly comprises the mechanism and system possessing the construction, combination of elements, and arrangement of parts which are exemplified in the following detailed disclosure.

SUMMARY OF THE INVENTION

A photographic camera apparatus of the type having means for defining a film plane in an optical path for transmitting light from a scene along the optical path to expose photosensitive film located in the film plane further comprises a blade mechanism together with means for mounting the blade mechanism for movement between one terminal position in which the blade mechanism is in light blocking relation with respect to the optical path so as to preclude scene light from being transmitted along the optical path to the film plane and another terminal position in which the blade mechanism is in light unblocking relation with respect to the optical path so as to allow the passage of scene light to the film plane. The blade mechanism is structured to define a progressively varying range of aperture sizes upon its displacement from its one terminal position toward its other terminal position. Actuable drive means are provided for displacing the blade mechanism between its one and other terminal positions to define a photographic exposure cycle. The drive means operates to displace the blade mechanism through its range of progressively varying sized apertures toward the other terminal position at a determinate velocity. A photoresponsive control arrangement is provided to control the duration of the photographic cycle in an automatic manner. There is further provided a manually adjustable trim arrangement for varying the exposure of the photographic exposure cycle by simultaneously adjusting the determinate velocity at which the blade mechanism is driven through its range of progressively sized apertures and the amount of scene light admitted to the photoresponsive control system.

The drive means may comprise an accelerator for initially accelerating the blade mechanism from its one terminal position toward its other terminal position thereafter releasing the blade mechanism at its determinate velocity prior to the blade mechanism reaching a position in which it defines any one of its varying aperture sizes whereupon the blade mechanism continues its displacement through its range of aperture sizes at substantially the same determinate velocity.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein like numbers have been employed in the different figures to denote the same parts wherein:

DESCRIPTION OF THE PREFERRED EMBODIMENT

Figure 1:
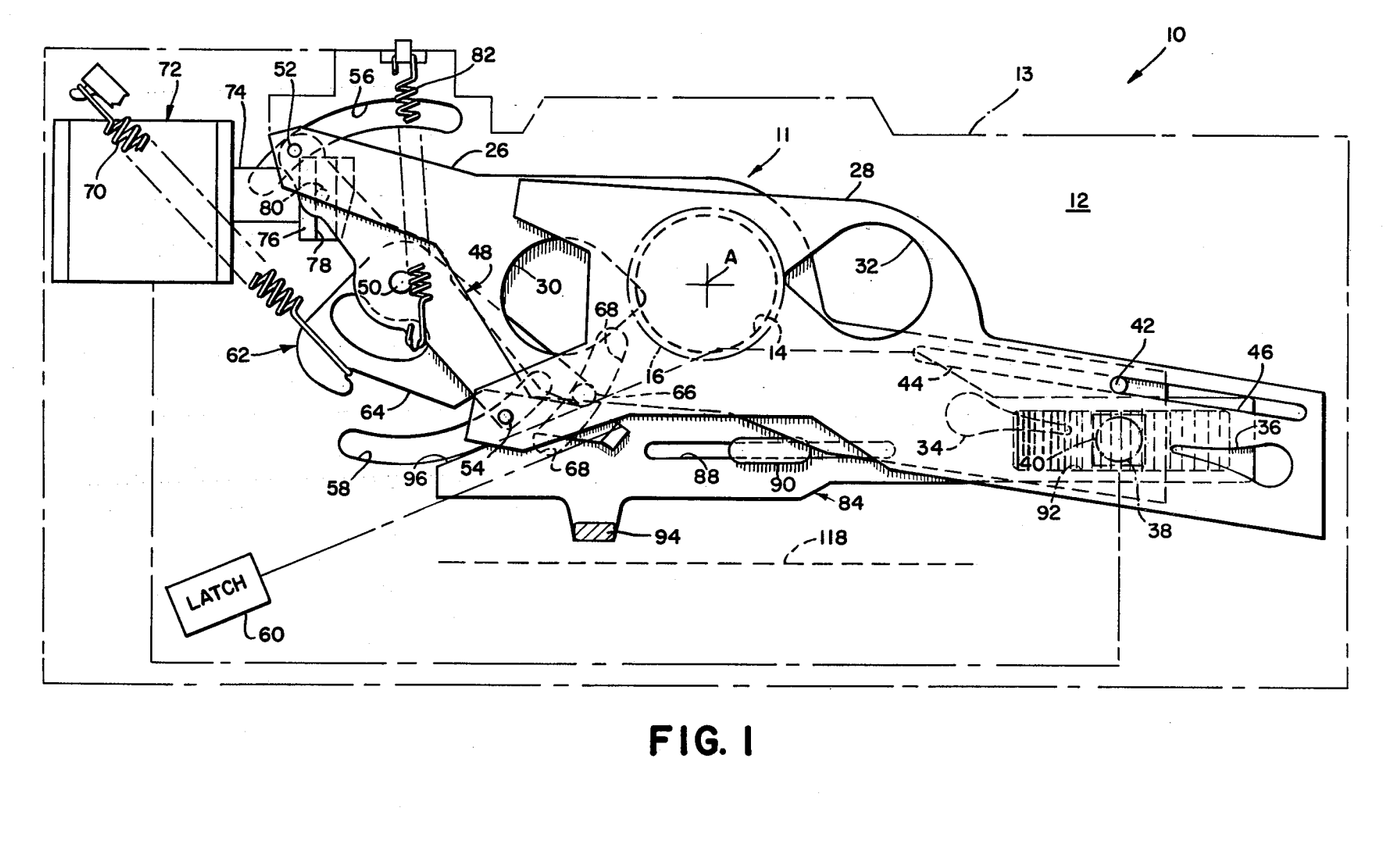
FIG. 1 is a front elevational cross sectional view of a camera embodying the exposure control apparatus of this invention.
Figures 2, 4:
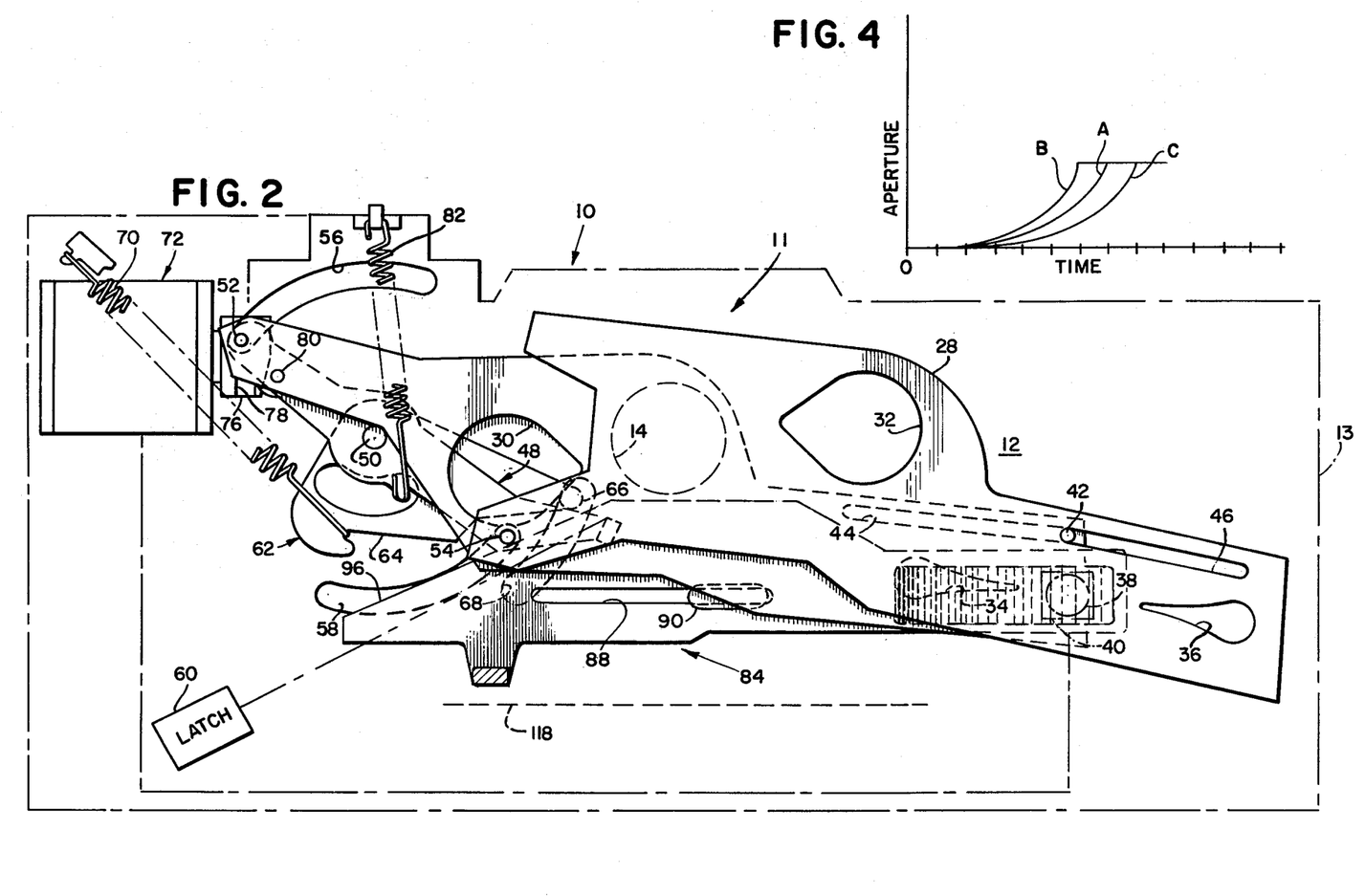
FIG. 2 is a front elevational cross sectional view of the camera of FIG. 1 showing the exposure control apparatus in a different position of its operation.
FIG. 4 is a graphical representation showing the variation in aperture versus time for the exposure control system in FIG. 1.
Figure 3:
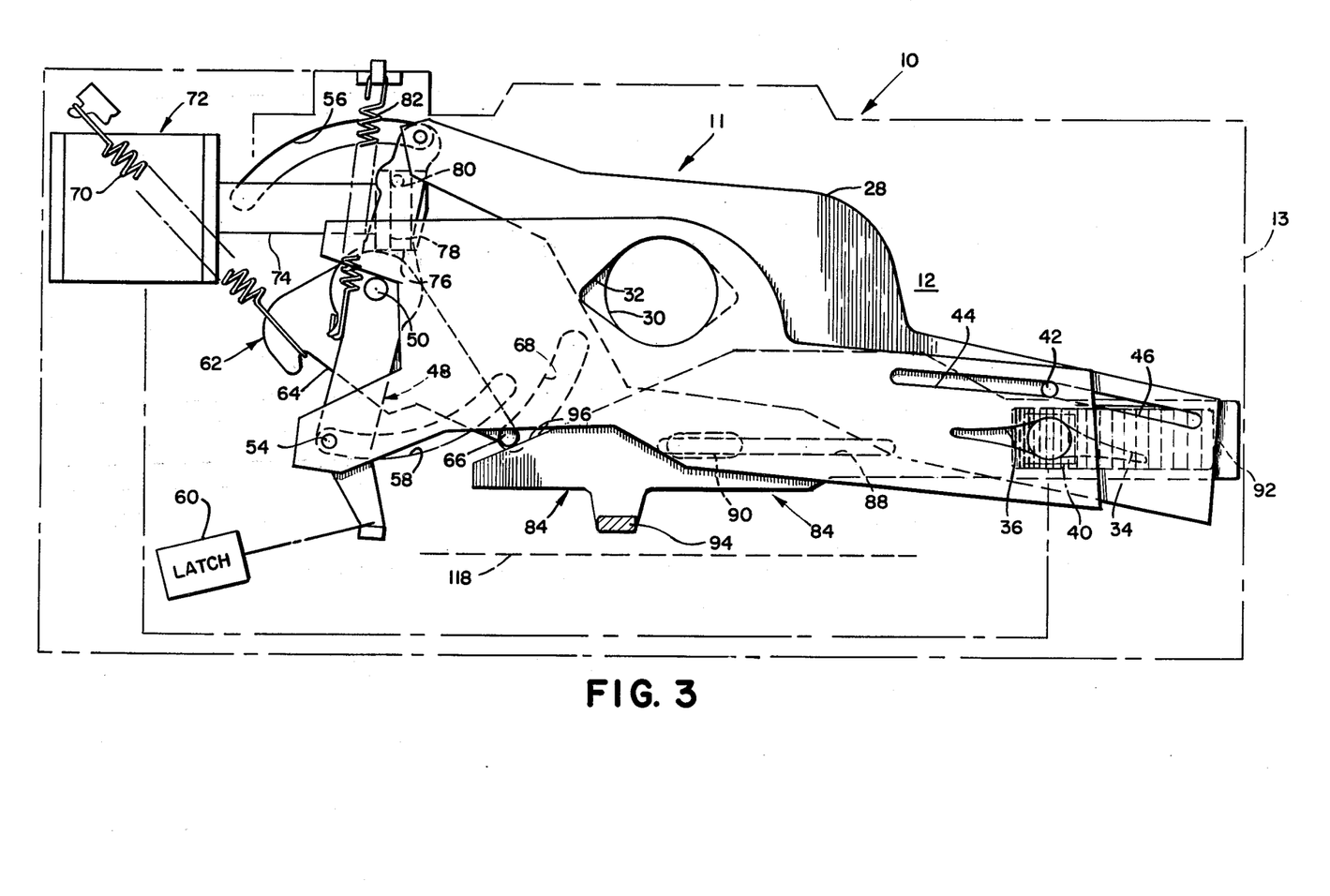
FIG. 3 is a front elevational cross sectional view of the camera of FIG. 1 showing the exposure control system in still another position of its mode of operation.

Referring now to FIGS. 1–3 it can be seen that the exposure control system of this invention is associated with the photographic camera apparatus 10 contained within a housing as shown generally at 13. A base block casting 12 is fixedly stationed within the housing 13 and selectively machined to support the various components of an exposure control system as shown generally at 11. Centrally disposed within the base block casting 12, there is provided a light entry exposure opening 14 which defines the maximum available exposure aperture for the system.

An objective or taking lens 16 is provided in overlying relation to the light entry opening 14 so as to define an optical axis or path A that extends normal to the plane of the drawing. The optical path is thereafter deflected downwardly by a mirror to a film plane 18 all of which are stationed within a suitable light-tight film exposure chamber within the housing 13 as is well known in the art and as is more fully described in U.S. Pat. No. 4,040,072, entitled "Shutter Latch Arrangement Releasable Through Shutter Actuation and Resetable Through Film Advancement" by B. Johnson et al. issued Aug. 2, 1977 in common assignment herewith.

Intermediate the objective lens 16 and light entry exposure opening 14 there is provided a shutter blade mechanism comprising two overlapping shutter blade elements 26 and 28 of the so-called "scanning type" which will be subsequently described in greater detail herein. Extending from the housing 13 there is provided a well-known photographic cycle initiating button (not shown), the actuation of which commences the photographic exposure interval by ultimately affecting the release of the shutter blade elements 26 and 28 in a manner to be subsequently described herein.

A pair of scene light admitting primary apertures 30 and 32 are provided respectively in the blade elements 26 and 28 to cooperatively define a progressive variation of effective aperture openings in accordance with simultaneous longitudinal and lateral displacement of one blade element with respect to the other blade element in a manner as is fully described in U.S. Pat. No. 3,942,183 entitled "Cameras with Pivoting Blades" by G. Whiteside, issued Mar. 2, 1976, in common assignment herewith. The apertures 30 and 32 are selectively shaped so as to overlap the light enter exposure opening 14 thereby defining a progressively varying range of aperture sizes as a function of the position of the blade elements 26 and 28.

Each of the blades 26 and 28 may additionally be configured to have corresponding photocontrol sweep secondary apertures shown respectively at 34 and 36. Secondary apertures 34 and 36 may be configured in correspondence with the shapes of scene light admitting primary apertures 30 and 32. As is readily apparent, the secondary apertures 34 and 36 also move in correspondence with the primary apertures 30 and 32 to define a small secondary effective aperture for admitting the passage of scene light to a photoresponsive element 38 of a photoresponsive control circuit as shown generally at 40. The photoresponsive control circuit 40 comprises the photoresponsive element 38 together with additional scene light integrating and control circuitry as is fully described in U.S. Pat. No. 4,023,187 entitled "Exposure Control System with Fill Flash Race Condition" by E. Shank, issued May 10, 1977, in common assignment herewith. In this manner, the exposure interval can be terminated as a function of the amount of scene light received through the secondary effective aperture as defined by the overlapping photocontrol secondary apertures 34 and 36.

Projecting from the base block casting 12 at a location spaced laterally apart from the light enter exposure opening 14, is a pivot pin or stud 42 which pivotally and translatably engages elongate slots 44 and 46 formed in respective shutter blade elements 26 and 28. Pin 42 may be formed with the base block casting 12 and blade elements 26 and 28 may be retained in engaging relation with respect to the pin 42 by any suitable means such as peening over the outside end of the pin 42.

The opposite ends of the blade elements 26 and 28 respectively include extended portions which pivotally connect to a walking beam 48. Walking beam 48, in turn, is disposed for rotation relative to the base block casting 12 by pivotal connection to a projecting pivot pin or stud 50 which may be integrally formed with base block casting 12 at a location spaced laterally apart from the light entry exposure opening 14. The walking beam 48 may be pivotally retained with respect to the pin 50 by any conventional means such as an E ring (not shown). In the preferred mode, the walking beam 48 is pivotally connected in its distal ends to the shutter blade elements 26 and 28 by respective pin members 52 and 54 which extend laterally outward from the walking beam 48. Pin members 52 and 54 are preferably circular in cross section and extend through respective circular openings in respective blade elements 26 and 28 so as to slidably engage respective arcuate slots or tracks 56 and 58 which may be integrally formed within the base block casting 12. The arcuate tracks 56 and 58 operate to inhibit disengagement of the blade elements 26 and 28 from their respective pin members 52 and 54 during the operation of the exposure control system. Thus, the walking beam 48 is pivotally connected near its distal ends to respective blade elements 26 and 28 and is disposed for rotation about a center axis (pin 50) intermediate its distal pivot connections to the blade elements 26 and 28 so that rotation of the walking beam 48 about its center axis operates to move the blade elements 26 and 28 in generally opposing directions between one terminal scene light blocking position as shown in FIG. 2 and another terminal scene light admitting position as shown in FIG. 3. The walking beam 48 and its associated pin members 50, 52 and 54 together with the pivot pin 42 collectively defined a means for mounting for shutter blade elements 26, 28 for movement between the aforementioned terminal positions.

Drive means comprising an accelerator assembly as shown generally at 62 and a tractive electromagnetic device such as a solenoid as shown generally at 72 are provided for displacing the shutter blade elements 26 and 28 between the terminal positions as shown in FIGS. 2 and 3. The accelerator assembly 62 comprises an accelerator member 64 preferably disposed for coaxial rotation with respect to the walking beam 48. The accelerator member 64 includes an integral depending pin portion 66 which extends forwardly into the locus of travel of the walking beam 48 and rearwardly into an arcuate track 68 which may be integrally formed within the base block casting 12. The arcuate track 68 and pin portion 66 cooperate to limit the movement of the accelerator member 64 within the locus of travel of the walking beam 48 in a manner to be more fully described in the subsequent paragraphs. The accelerator member 64 is yieldably biased by a tension spring 70 which is fixedly connected at one end to the base block casting 12 and connected at its other end to the accelerator member 64 in a manner operating to bias the accelerator member 64 to rotate in a clockwise direction so as to urge the pin portion 66 into engagement with the walking beam 48.

The solenoid 72 comprises an internally disposed cylindrical plunger unit 74 which retracts inwardly into the body of the solenoid upon energization of the solenoid winding. The solenoid plunger 74 includes an end cap 76 at the outside end thereof together with a vertical slot or groove 78 within the end cap 76 for loosely engaging a pin 80 extending outwardly from the walking beam 48. In this manner, the solenoid plunger 74 is affixed to the walking beam 48 so that longitudinal displacement of the plunger 74 will operate to rotate the walking beam around its center pivot pin 50 so as to appropriately displace the shutter blade elements across each other in generally opposing directions.

Prior to the initiation of a photographic exposure cycle, the shutter blade elements 26 and 28 are maintained at an intermediate scene light blocking position as shown in FIG. 1 between the aforementioned terminal positions as shown in FIGS. 2 and 3 by a latch mechanism as shown generally at 60 and as is more fully disclosed in the U.S. Pat. No. 4,040,072, supra. A photographic exposure cycle is commenced by manually actuating the aforementioned photographic cycle initiating button which, in turn, affects energization of the solenoid 72 so as to retract the plunger 74 and pivot the walking beam 48 in a counterclockwise direction from its position as shown in FIG. 1 to its position as shown in FIG. 2. During this counterclockwise rotation of the walking beam 48 towards its terminal position as shown in FIG. 2, a latch mechanism 60 disengages from the walking beam 48 in a manner as is more fully described in U.S. Pat. No. 4,040,072, supra. In addition, the walking beam 48 also operates to engage the pin portion 66 from the accelerator member 64 so as to rotate the accelerator member 64 in a counterclockwise direction against the yieldable bias of its tension spring 70.

The solenoid 72 is subsequently de-energized in a manner as is again more fully described in U.S. Pat. No. 4,040,072, supra, so as to release the walking beam 48 for acceleration by the accelerator member 64 in the following manner. The accelerator member 64 is biased by the tension spring 70 to rotate in a clockwise direction with its depending pin portion 66 engaged to the walking beam 48 in a manner operating to accelerate the walking beam 48 to a predetermined velocity. As is readily apparent, the arcuate track 68 limits the extent of rotation of the accelerator member 64 so as to affect the disengagement of the accelerator member from the walking beam 48 prior to the blade elements 26 and 28 reaching a position in which the primary scene light admitting apertures 30 and 32 overlap to define any one of their varying effective aperture sizes. The momentum of the shutter blade elements 26 and 28 and their associated mounting means operates to continue the displacement of the shutter blade elements 26 and 28 through their range of progressively varying aperture sizes at substantially the same predetermined velocity to which the shutter blade elements 26 and 28 were initially accelerated by the accelerator assembly 62.

The drive means may additionally include an over center spring 82 one end of which is fixedly connected with respect to the base block casting 12 and the other end of which is connected to the walking beam 48 for counterbalancing the friction of the walking beam 48 and its associated shutter blade elements 26 and 28 thereby substantially maintaining the predetermined velocity of the blade mechanism as it moves through its range of progressively varying aperture sizes toward the other terminal position as shown in FIG. 3.

The aforementioned movement of the shutter blade elements 26 and 28 also operates to move the secondary apertures 34 and 36 into overlapping relationship with respect to each other in correspondence with the primary apertures 30 and 32 to define a range of progressively varying secondary effective apertures over the photoresponsive element 38. The photoresponsive element 38, in turn, provides a time varying response corresponding to the intensity of scene light incident thereon. The photocontrol circuit 40 operates to integrate the output signal from the photoresponsive element 38 such that upon reaching a predetermined exposure value for the film, there is provided a signal to the solenoid 72 to again energize the solenoid and retract the plunger 74 therein thereby rotating the walking beam 48 in a counterclockwise direction back to its scene light blocking arrangement as shown in FIG. 1.

In such an automatic exposure control system, it is also preferred to provide the photographer with a degree of overriding personal control through which he may slightly vary the exposure in order to accommodate for varying conditions in the ambient scene lighting. Toward this end, there is provided a variable trim assembly as shown generally at 84 comprising a trim member 86 having an elongated slot 88 therethrough disposed for reciprocal sliding translation about a depending stud 90 extending laterally forward from the base block casting 12. The trim member 86 is also provided with a variable density filter as shown at 92 wherein the light transmissive properties of the filter 92 progressively vary along the longitudinal length thereof. The variable density filter 92 may alternatively be provided with a plurality of sections, each of which exhibits a different light transmissive property therethrough in a manner as is more fully described in U.S. Pat. No. 4,007,468 entitled "Trim Control Apparatus for Photographic Exposure Control System", by I. Blinow issued Feb. 8, 1977 in common assignment herewith. The trim member 86 also defines a profile cam 96 which may be slid across the arcuate track 68 into interfering relationship with the locus of travel of the depending pin portion 66 from the accelerator member 64. The trim member 86 is further provided with a manually actuable handle 94 extending forwardly therefrom in a direction generally normal to the plane of the drawings to a position outside of the camera housing 13 from which it can be manually grasped to trim an exposure control system in the following manner.

The trim member 86 is normally stationed at an intermediate neutral position from which it may be slid either to the right or the left to selectively increase or decrase the film exposure in accordance with the personal preferences of the photographer. A detente (not shown) may be provided to engage a corresponding slot (not shown) in the trim member 86 in order to enable the photographer to be able to readily identify the neutral position in a manner as is more fully described in U.S. Pat. No. 4,007,468, supra. As is readily apparent, sliding the trim member 86 operates to move the variable density filter 92 across the photoresponsive element 38 to adjust the amount of scene light permitted to enter the photoresponsive element 38 through the photocontrol secondary apertues 34 and 36.

At the same time, sliding motion of the profile cam 92 across the arcuate track 86 operates to vary the extent of movement permitted the accelerator member 64 upon accelerating the walking beam 48 thereby affecting a corresponding change in the velocity to which the accelerator member 64 accelerates the walking beam 48 and shutter blade elements 26 and 28. Thus, sliding the trim member 86 to its extreme left hand position, as shown in FIG. 2, operates to impose the greatest limitation upon the degree of rotation permitted the accelerator member 64 thereby providing the lowest determinate velocity to which the blades may be accelerated. As is readily apparent, the reduced shutter blade velocity operates to present a smaller aperture when an artificial light source such as an electronic flash is fired at a determinate time after commencement of the exposure interval as disclosed in U.S. Patent Ser. No. 960,062 entitled "Proportional Fill Flash", by A. LaRocque et al., filed in common assignment herewith. Thus, under conditions of low ambient scene light intensity where the source of artificial illumination would normally be used, the photographer may selectively decrease the film exposure in the foregoing manner. The variable density filter 92 is simultaneously moved over the photoresponsive element 38 to its extreme position of highest transmittance so as to decrease the exposure time as determined by the photoresponsive control circuit 40 under conditions of high ambient scene light intensity where the source of artificial illumination might be used for flash fill in.

Conversely, movement of the trim member 86 to its extreme right hand position as shown in FIG. 3 permits the greatest degree of rotation for the accelerator member 64 thereby allowing the walking beam 48 and its associated shutter blade elements 26 and 28 to be accelerated to the highest determined velocity possible. As is readily apparent, such an increase in the shutter blade speed operates to present a larger aperture when the artificial light source is fired at the determinate time after commencement of the exposure interval as disclosed in U.S. Patent Application Ser. No. 960,062, Nov. 13, 1978, now U.S. Pat. No. 4,192,587, Mar. 11, 1980 supra. Thus under conditions of low ambient scene light intensity, where the source of artificial illumination would normally be used, the photographer may selectively increase the film exposure in the foregoing manner. The variable density filter 92 is simultaneously moved over the photoresponsive element 38 to its extreme position of least transmittance thereby allowing the least amount of scene light to reach the photoresponsive element 38 so as to cause the photoresponsive control circuit 40 to increase the exposure interval and thereby increase the film exposure under conditions of high ambient scene light intensity where the source of artificial illumination might be used for fill flash purposes.

As is how readily apparent, the manually adjustable trim assembly 86 provides the photographer with a varying degree of personal control by allowing him to vary the exposure of a photographic exposure cycle by simultaneously adjusting the determinate velocity to which the accelerator assembly 62 accelerates the shutter blade elements 26 and 28 and the amount of scene light admitted to the photoresponsive element 38 by the photocontrol secondary apertures 34 and 36.

Referring now to FIG. 4 where there is shown a graphical representation of changing aperture area vs. time where it can be seen that the aforementioned trim assembly provides a uniform and linear trim throughout its operative range. Referring now to curve A of FIG. 4, there is shown the variation in aperture vs. time when the trim member 86 is stationed in its neutral position as shown in FIG. 1. The change in aperture vs. time when the trim member 86 is moved to its extreme right hand and left hand positions is shown respectively by the curves B and C. As is readily apparent, the curves A, B and C may all be parabolic since the shutter blade elements 26 and 28 always more at a constant determinate velocity regardless of the position of the trim member 86. Thus, at any point of time during the exposure cycle it can be seen that the change in aperture affected by the trim adjustment is constant except for the maximum aperture position. The trim assembly 86 may therefore be calibrated to provide a plus or minus one-stop change in aperture value throughout substantially the entire duration of the exposure cycle except for the maximum aperture defining position.

Since the velocity of the shutter blade elements 26 and 28 enclose an entire range of progressively varying apertures, the scene light admitting apertures 30 and 32 may be configured to cooperatively define diamond-shaped primary apertures which have the advantage of providing equal depth of field in both horizontal and vertical directions.

Certain changes may be made in the above-described embodiment without departing from the scope of the invention, and those skilled in the art may make still other changes according to the teachings of the present invention. Therefore, it is intended that all matter contained in the above description or shown in the accompanying drawings shall be interpreted as illustrative and not in a limiting sense.

What is claimed is:

1. A photographic camera apparatus of the type having means for defining a film plane and an optical path for transmitting light from a scene along the optical path to expose photosensitive film located in the film plane, said apparatus comprising:

a blade mechanism;

means for mounting said blade mechanism for movement between one terminal position in which said blade mechanism is in light blocking relation with respect to the optical path so as to preclude scene light from being transmitted along the optical path to the film plane and another terminal position in which said blade mechanism is in light unblocking relation with respect to said optical path so as to allow the passage of scene light to the film plane, said blade mechanism being structured to maintain its said light blocking relationship with respect to the optical path upon its initial displacement from its said one terminal position toward its said other terminal position and to thereafter define a progressively varying range of aperture sizes upon its continued displacement toward its said other terminal position; and actuable drive means for displacing said blade mechanism between its said one and other terminal positions, said drive means comprising accelerator means for initially accelerating said blade mechanism from its said one terminal position towards its said other terminal position and for thereafter releasing said blade mechanism at a determinate velocity prior to said blade mechanism reaching a position in which it defines any one of its said varying aperture sizes, allowing continued displacement of said blade mechanism through said range of aperture sizes at substantially said determinate velocity, said drive means additionally including return means for driving said blade mechanism toward said one terminal position back through said range of aperture sizes to complete a photographic exposure cycle, said accelerator means also comprising an accelerator member disposed for limited movement within the locus of travel of said blade mounting means and resilient means for yieldably biasing said accelerator member to move into engagement against said blade mounting means so as to drive said blade mechanism from said one terminal position toward said other terminal position, said accelerator means further comprising means for limiting the extent of movement of said accelerator member to effect the disengagement of said accelerator member from said blade mounting means prior to said blade mechanism reaching a position in which it defines any one of its said varying aperture sizes.

2. The camera apparatus of claim 1 wherein said drive means further includes means for counterbalancing the friction of said mounting means in order to substantially maintain said determinate velocity as said blade mechanism moves through said range of aperture sizes toward said other terminal position.

3. The camera apparatus of claim 1 including manually adjustable trim means for varying the duration of said photographic exposure cycle by adjusting said determinate velocity to which said accelerator means accelerates said blade mechanism.

4. The camera apparatus of claim 1 wherein: said blade mechanism comprises two overlapping blade elements having respective apertures therethrough, said mounting means comprises a walking beam pivotally connected near its distal ends to respective blade elements and disposed for rotation about a center axis intermediate its said distal pivot connections to said blade elements such that rotation of said walking beam about its said center axis operates to move said blade elements in generally opposing directions between said one and other terminal positions, said accelerator member is disposed for limited movement within the locus of travel of said walking beam, said resilient means yieldably biases said accelerator member to move into engagement against said walking beam so as to drive said walking beam from said one terminal position toward said other terminal position, and said means for limiting the extent of movement of said accelerator member effects the disengagement of said accelerator member from said walking beam prior to said blade mechanism reaching a position in which it defines any one of its said varying aperture sizes.

5. The camera apparatus of claim 4 further including manually adjustable trim means for varying the extent of movement permitted said accelerator member and effecting a corresponding adjustment in the velocity of which said accelerator means accelerates said blade mechanism in order to trim the exposure of said photographic cycle.

6. The camera apparatus of claim 5 wherein said accelerator member is disposed for rotation in the locus of travel of said walking beam such that rotation of said walking beam from said other terminal position toward said one terminal position operates to move said walking beam into engagement with said accelerator member so as to move said accelerator member against the yieldable bias of said resilient biasing means.

7. The camera apparatus of claim 4 wherein said drive means comprises an over center spring connecting said walking beam and applying thereto a force for counterbalancing the friction of said mounting means in order to substantially maintain said determinate velocity as said blade mechanism moves through said range of aperture sizes toward said other terminal position.

8. A photographic camera apparatus of the type having means for defining a film plane and an optical path for transmitting light from a scene along the optical path to expose photosensitive film located in the film plane, said apparatus comprising:
a blade mechanism;
means for mounting said blade mechanism for movement between one terminal position in which said blade mechanism is in light blocking relation with respect to the optical path so as to preclude scene light from being transmitted along the optical path to the film plane and another terminal position in which said blade mechanism is in light unblocking relation with respect to said optical path so as to allow the passage of scene light to the film plane, said blade mechanism being structured to maintain its said light blocking relationship with respect to the optical path upon its initial displacement from its said one terminal position toward its said other terminal position and to thereafter define a progressively varying range of aperture sizes upon its continued displacement toward its said other terminal position wherein said blade mechanism comprises two overlapping blade elements having respective apertures therethrough, said mounting means comprises a walking beam pivotally connected near its distal ends to respective blade elements and disposed for rotation about a center axis intermediate its said distal pivot connections to said blade elements such that rotation of said walking beam about its said center axis operates to move said blade elements in generally opposing directions between said one and other terminal positions;
actuable drive means for displacing said blade mechanism between its said one and other terminal positions, said drive means comprising accelerator means for initially accelerating said blade mechanism from its said one terminal position towards its said other terminal position and for thereafter releasing said blade mechanism at a determinate velocity prior to said blade mechanism reaching a position in which it defines any one of its said varying aperture sizes, allowing continued displacement of said blade mechanism through said range of aperture sizes at substantially said determinate velocity, said drive means additionally including return means for driving said blade mechanism toward said one terminal position back through said range of aperture sizes to complete a photographic exposure cycle wherein said accelerator means comprises an accelerator member disposed for limited movement within the locus of travel of said walking beam and resilient means for yieldably biasing said accelerator member to move into engagement against said walking beam so as to drive said walking beam from said one terminal position toward said other terminal position, said accelerator means further comprising means for limiting the extent of movement of said accelerator member to effect the disengagement of said accelerator member from said walking beam prior to said blade mechanism reaching a position in which it defines any one of its said varying aperture sizes; and manually adjustable trim means for varying the extent of movement permitted said accelerator member and effecting a corresponding adjustment in the velocity to which said accelerator means accelerates said blade mechanism in order to trim the exposure of said photographic cycle wherein said accelerator member is disposed for rotation in the locus of travel of said walking beam such that rotation of said walking beam from said other terminal position toward said one terminal position operates to move said walking beam into engagement with said accelerator member so as to move said accelerator member against the yieldable bias of said resilient biasing means and wherein said trim means comprises a trim member having a cam surface disposed for sliding movement into the locus of travel of said accelerator member.

9. A photographic camera apparatus of the type having means for defining a film plane and an optical path for transmitting light from a scene along the optical path to expose photosensitive film located in the film plane, said apparatus comprising:
a blade mechanism;
means for mounting said blade mechanism for movement between one terminal position in which said blade mechanism is in light blocking relation with respect to the optical path so as to preclude scene light from being transmitted along the optical path to the film plane and another terminal position in which said blade mechanism is in light unblocking relation with respect to said optical path so as to allow the passage of scene light to the film plane, said blade mechanism being structured to maintain its said light blocking relationship with respect to the optical path upon its initial displacement from its said one terminal position toward its said other terminal position and to thereafter define a progressively varying range of aperture sizes upon its continued displacement toward its said other terminal position; and
actuable drive means for displacing said blade mechanism between its said one and other terminal positions, said drive means comprising accelerator means for initially accelerating said blade mechanism from its said one terminal position towards its said other terminal position and for thereafter releasing said blade mechanism at a determinate velocity prior to said blade mechanism reaching a position in which it defines any one of its said varying aperture sizes, allowing continued displacement of said blade mechanism through said range of aperture sizes at substantially said determinate velocity, said drive means additionally including return means for driving said blade mechanism toward said one terminal position back through said range of aperture sizes to complete a photographic cycle wherein said blade mechanism comprises two overlapping blade elements each having a primary scene light admitting aperture therethrough and a secondary photocontrol aperture therethrough and said mounting means comprises a walking beam pivotally connected near its distal ends to respective blade elements and disposed for rotation about a center axis intermediate its said distal pivot connections to said blade elements such that rotation of said walking beam about its said center axis operates to move said blade elements in generally opposing directions between said one and other terminal positions, said camera apparatus further including photoresponsive control means responsive to the scene light admitted by said secondary photocontrol apertures for controlling the duration of the photographic exposure cycle and manually adjustable trim means for varying the duration of said photographic exposure cycle by simultaneously adjusting said determinate velocity to which said accelerator means accelerates said blade mechanism and the amount of scene light admitted to said photoresponsive control means by said photocontrol apertures.

10. The camera apparatus of claim 9 wherein said accelerator means comprises an accelerator member disposed for limited movement within the locus of travel of said walking beam and resilient means for yieldably biasing said accelerator member to move into engagement against said walking beam so as to drive said walking beam from said one terminal position toward said other terminal position, said trim means operating to vary the extent of movement permitted said accelerator member and effect a corresponding adjustment in the velocity to which said accelerator means accelerates said blade mechanism in order to trim the duration of said photographic cycle.

11. The camera apparatus of claim 10 wherein said accelerator member is disposed for rotation in the locus of travel of said walking beam such that rotation of said walking beam from said other terminal position toward said one terminal position operates to move said walking beam into engagement with said accelerator member so as to move said accelerator member against the yieldable bias of said resilient biasing means.

12. The camera of claim 11 wherein said trim means comprises a trim member having a cam surface disposed for sliding movement into the locus of travel of said accelerator means and a variable density filter disposed for sliding movement across said secondary photocontrol apertures.

13. The camera of claim 12 wherein said drive means comprises an over center spring connecting said walking beam and applying thereto a force for counterbalancing the friction of said mounting means in order to substantially maintain said determinate velocity as said blade mechanism moves through said range of aperture sizes toward said other terminal position.

14. A photographic camera apparatus of the type having means for defining a film plane and an optical path for transmitting light from a scene along the optical path to expose photosensitive film located in the film plane, said apparatus comprising:
a blade mechanism;
means for mounting said blade mechanism for movement between one terminal position in which said blade mechanism is in light blocking relation with respect to the optical path so as to preclude scene light from being transmitted along the optical path to the film plane and another terminal position in which said blade mechanism is in light unblocking relation with respect to said optical path so as to allow the passage of scene light to the film plane, said blade mechanism being structured to define a progressively varying range of aperture sizes upon its displacement from its said one terminal position toward its said other terminal position;

actuable drive means for displacing said blade mechanism between its said one and other terminal positions to define a photographic exposure cycle, said drive means operating to displace said blade mechanism through said range of progressively varying sized apertures toward said other terminal position at a determinate velocity;

photoresponsive control means responsive to admitted scene light for controlling the duration of the photographic exposure cycle, and manually adjustable trim means for varying the exposure of said photographic exposure cycle by simultaneously adjusting said determinate velocity at which said blade mechanism is driven through said range of progressively sized apertures and the amount of scene light admitted to said photoresponsive control means.

15. The photographic camera of claim 14 wherein said trim means includes a variable density filter disposed for sliding movement with respect to the scene light admitted to said photoresponsive control means.

16. A photographic camera apparatus of the type having means for defining a film plane and an optical path for transmitting light from a scene to photosensitive film located in the film plane, said apparatus comprising:

a blade mechanism;

means for mounting said blade mechanism for movement between one position in which said blade mechanism is in light blocking relation with respect to the optical path so as to preclude scene light from being transmitted to the film plane and another position in which said blade mechanism is in light unblocking relation with respect to said optical path so as to allow the passage of scene light to the film plane, said blade mechanism being structured to define a progressively varying range of aperture sizes during its displacement between its said one and other positions;

actuable drive means for displaceing said blade mechanism between its said one and other positions, said drive means comprising accelerator means for initially drivingly accelerating said blade mechanism from its said one position toward its said other position to attain a determinate velocity and for thereafter becoming drivingly disassociated from said blade mechanism through at least a substantial portion of said range of aperture sizes under the influence of inertial forces imparted thereto by said accelerator means, and means readily accessible to a photograph for selectively adjusting said accelerator means to effect a change in said determinate velocity.

17. In a system for effecting the movement of a blade mechanism from a first arrangement wherein it precludes scene light from impinging upon the film plane of a camera into a second arrangement wherein it defines a scene light transmitting aperture of maximum size permitting scene light to impinge upon the film plane, said blade mechanism defining a varying range of aperture sizes during its said movement, the improvement comprising accelerator means for initially drivingly accelerating said blade mechanism from its said first arrangement towards its said second arrangement to attain a determinate velocity and thereafter becoming drivingly disassociated from said blade mechanism allowing continued displacement of said blade mechanism through at least a substantial portion of said range of aperture sizes under the influence of inertial forces imparted thereto by said accelerator means, and means readily accessible to an operator for selectively adjusting said accelerator means to effect a change in said determinate velocity.

18. The invention of claims 16 or 17 wherein said accelerator means is arranged to become drivingly disassociated from said blade mechanism prior to said blade mechanism defining any of said aperture sizes.

19. The invention of claim 16 wherein said drive means additionally includes a spring arranged to exert a force on said mounting means at least during the portion of the movement of said blade mechanism during which said accelerator means is drivingly disassociated therewith, said spring force acting against, and substantially counterbalancing, frictional forces of said mounting means in order to substantially maintain said determinate velocity as said blade mechanism moves towards its said other position.

20. The invention of claim 16 or 17 wherein: said blade mechanism comprises two overlapping blade elements having respective apertures therethrough, said mounting means comprises a walking beam pivotally connected near its distal ends to respective blade elements and disposed for rotation about a center axis intermediate its said distal pivot connections to said blade elements such that rotation of said walking beam about its said center axis operates to move said blade elements in generally opposing directions between said one and other positions, said accelerator means comprises: an accelerator member disposed for limited movement within the locus of travel of said walking beam, resilient means for yieldably biasing said accelerator member to move into engagement against said walking beam so as to drive said walking beam from said one position toward said other position, and said adjusting means includes manually adjustable trim means for varying the extent of movement permitted said accelerator member so as to effect a corresponding adjustment in the velocity to which said accelerator means accelerates said blade mechanism in order to trim the exposure of said photographic cycle.

21. The invention of claim 16 or 17 for use in a camera of the type having means for firing an electronic flash at a determinate time corresponding to subject range after commencement of the exposure interval wherein: said blade mechanism comprises two overlapping blade elements having respective apertures therethrough, said mounting means comprises a walking beam pivotally connected near its distal ends to respective blade elements and disposed for rotation about a center axis intermediate its said distal pivot connections to said blade elements such that rotation of said walking beams about its said center axis operates to move said blade elements in generally opposed directions between said one and other positions, and said accelerator means comprises: an accelerator member disposed for limited movement within the locus of travel of said walking beam, resilient means for yieldably biasing said accelerator member to move into engagement against said walking beam so as to drive said walking beam from said one position toward said other position, and said adjusting means includes manually adjustable trim means for either increasing the extent of movement permitted said accelerator member so as to effect a corresponding increase in the velocity to which said blade meachnism is accelerated thereby presenting a larger aperture at the instant of electronic flash firing so as to increase the film exposure or for decreasing the extent of movement permitted said accelerator means so as to effect a corresponding decrease in the velocity to which said blade mechanism is accelerated thereby presenting a smaller aperture at the instant of electronic flash firing so as to decrease the film exposure.

22. A photographic camera apparatus of the type having means for defining a film plane and an optical path for transmitting light from a scene to photosensitive film located in the film plane, said apparatus comprising:

a blade mechanism;

means for mounting said blade mechanism for movement between one position in which said blade mechanism is in light blocking relation with respect to the optical path so as to preclude scene light from being transmitted to the film plane and another position in which said blade mechanism is in light unblocking relation with respect to said optical path so as to allow the passage of scene light to the film plane, said blade mechanism being structured to define a progressively varying range of aperture sizes during its displacement between its said one and other positions; and actuable drive means for displacing said blade mechanism between its said one and other positions, said drive means comprising accelerator means for initially drivingly accelerating said blade mechanism from its said one position toward its said other position to attain a determinate velocity and for thereafter becoming drivingly disassociated from said blade mechanism through said range of aperture sizes under the influence of inertial forces imparted thereto by said accelerator means, said accelerator means comprising an accelerator member disposed for limited movement within the locus of travel of said blade mounting means and resilient means for yieldably biasing said accelerator member to move into engagement against said blade mounting means so as to drive said blade mechanism from said one terminal position toward said other terminal position, said accelerator means further comprising means for limiting the extent of movement of said accelerator member to effect the disengagement of said accelerator member from said walking beam prior to said blade mechanism reaching a position in which it defines any one of its said varying aperture sizes.

23. In a system for effecting the movement of a blade mechanism from a first arrangement wherein it precludes scene light from impinging upon the film plane of a camera into a second arrangement wherein it defines a scene light transmitting aperture of maximum size permitting scene light to impinge upon the film plane, said blade mechanism defining a varying range of aperture sizes during its said movement, the improvement comprising accelerator means for initially drivingly accelerating said blade mechanism from its said first arrangement towards its said second arrangment to attain a determinate velocity and thereafter becoming drivingly disassociated from said blade mechanism allowing continued displacement of said blade mechanism through said range of aperture sizes under the influence of inertial forces imparted thereto by said accelerator means, said accelerator means comprising an accelerator member disposed for limited movement within the locus of travel of said blade mounting means and resilient means for yieldably biasing said accelerator member to move into engagement against said blade mounting means so as to drive said blade mechanism from said one terminal position toward said other terminal position, said accelerator means further comprising means for limiting the extent of movement of said accelerator member to effect the disengagement of said accelerator member from said blade mechanism prior to said blade mechanism reaching a position in which it defines any one of its said varying aperture sizes.

* * * * *